(12) United States Patent
Arunmozhi et al.

(10) Patent No.: US 12,468,717 B2
(45) Date of Patent: *Nov. 11, 2025

(54) IMPRESSION DISCOUNTING FOR FOLLOWFEED

(71) Applicant: Microsoft Technology Licensing, LLC, Redmond, WA (US)

(72) Inventors: Madhulekha Arunmozhi, Sunnyvale, CA (US); Ian Robert Ackerman, Mountain View, CA (US); Birjodh Singh Tiwana, Dublin, CA (US); Sarah Yan Xing, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,227

(22) Filed: Oct. 17, 2024

(65) Prior Publication Data

US 2025/0036639 A1 Jan. 30, 2025

Related U.S. Application Data

(63) Continuation of application No. 17/668,153, filed on Feb. 9, 2022, now Pat. No. 12,182,138.

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .......... G06F 16/24578; G06F 16/9535; G06F 16/9537; G06F 16/9538; G06F 16/958; G06Q 10/10; G06Q 30/0251; G06Q 30/0282; G06Q 50/01
See application file for complete search history.

(56) References Cited

U.S. PATENT DOCUMENTS

| | | | |
|---|---|---|---|
| 2015/0026148 A1* | 1/2015 | Howes | G06F 16/93 707/706 |
| 2015/0317714 A1* | 11/2015 | Huet | G06Q 30/0278 705/26.62 |
| 2019/0188323 A1* | 6/2019 | Ghosh | G06N 20/00 |

* cited by examiner

*Primary Examiner* — Apu M Mofiz
*Assistant Examiner* — Oscar Wehovz
(74) *Attorney, Agent, or Firm* — Cantor Colburn LLP; Renee D. Brown

(57) ABSTRACT

Described herein is a technique for surfacing content for users of a connection network application. The technique involves performing a first query to fetch recently-impressed items viewed by a user of the connection network application and, concurrently with the first query, performing a second query of search nodes to generate a set of search node results. The technique allows for filtering the recently-impressed items from the set of search node results to generate a candidate set and applying a freshness factor to the candidate set. Updates are provided to a user display, based on results of applying the freshness factor to the candidate set.

20 Claims, 5 Drawing Sheets

IMPRESSION DISCOUNTING FOR FOLLOWFEED

TECHNICAL FIELD

The present application generally relates to a technical improvement in the manner by which an online service provides updates to a user of the online service. More specifically, the present application describes a technique for surfacing fresh content to users of a content publisher system based on impression discounts and freshness and aging factors.

BACKGROUND

An online connection network system is a web-based platform (e.g., a connection networking web site) that may be accessed by a user via a web browser or via a mobile application provided on a mobile phone, a tablet, etc. Each member registered with the online connection network may be represented by a user profile, which, in turn, may be represented by one or more web pages. Online connection network systems provide members with a mechanism for defining, and memorializing in a digital format, representations of themselves (e.g., member profiles) and their relationships with other people. Members of online connection network services may view relevant updates and other content provided by members, companies, and other entities to which they have a connection or other relationship. Once a member has viewed an update, the member typically does not want to see that update again, and therefore it is desirable to filter previously seen content using a technique known as impression discounting. Some traditional services perform this filtering at a final stage immediately before the content would have otherwise reached the user. Thus, traditional systems may use up valuable time and bandwidth retrieving content that will end up not being of interest to the user at the final stage.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
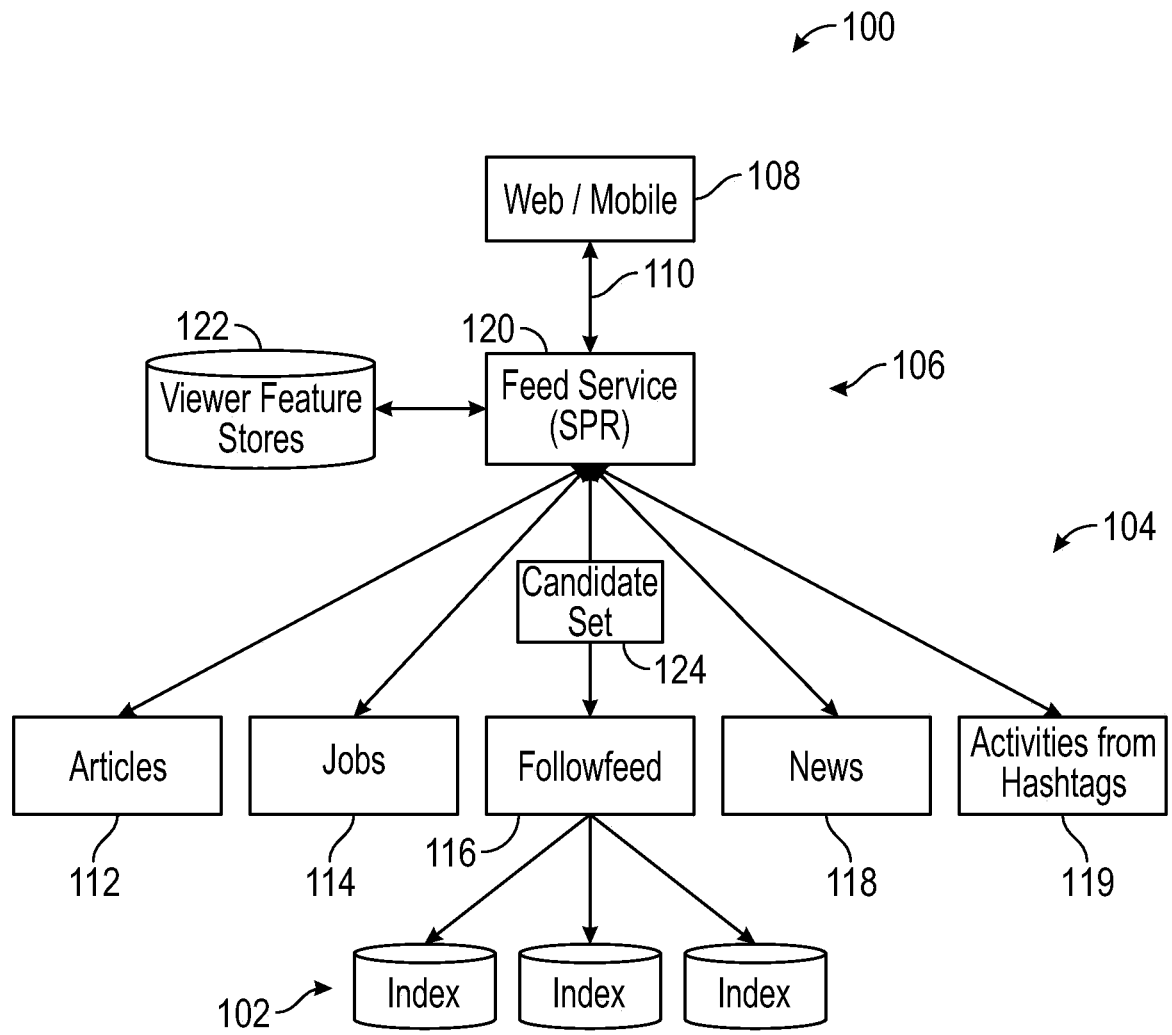
FIG. 1 is a functional block diagram illustrating an example of a feed service/system with which an embodiment of the present invention may be implemented and deployed.

Described herein are methods and systems that provide a unified framework, incorporating different competing objectives and multiple constraints, for generating feed content on a connection network platform. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Members of online connection network services, such as online social networking services, may be provided with the opportunity to view relevant updates and other content provided by members, companies, and other entities to which they have a connection or other relationship. Once a member has viewed an update, the member typically does not want to see that update again, and therefore it is desirable to filter previously seen content using a technique known as impression discounting. In the context of this invention, an "impression" of an item means that the item has been displayed to a user. If an impressed item is not engaged with (i.e., if the impressed item is neither accepted nor rejected) then an online system may aim to reduce (i.e., discount) the likelihood that the impressed item will be push out as a recommendation again.

Some traditional services perform impression discounting at a final stage immediately before the content would have otherwise reached the user. Thus, traditional systems may use up valuable time and bandwidth retrieving content that will end up not being of interest to the user at the final stage. User experience can become degraded due to these concerns.

The above concerns can be addressed by performing impression discounting earlier, such as in a candidate generation process, which allows sending additional 30% of unexplored inventory to second pass rankers (SPRs, defined later herein). This can increase uniqueness of results. However, experimental data in this space has shown an increase in members viewing older content (4-14 days) in their feeds, which leads to a suboptimal user experience. In other words, while impression discounting can return more unique results, this does not mean the results returned are fresher. Instead, because the system has more space, the returned results can be filed with older items, thus degrading the user experience.

To address concerns around decaying freshness generated by performing impression discounting in the candidate generation process, systems according to the invention can apply a global freshness factor at the SPR layer, as described later herein, that decays updates based on age buckets corresponding to the UI age that is displayed to a user to indicate age of an item.

When combined with impression discounting at the candidate generation layer, the freshness factor can help mitigate or prevent the presence of very old updates in the top slots of the feed. However, optimizing only for freshness can hurt user engagement, and therefore the invention combines earlier impression discounting with a global freshness factor to increase both engagement and freshness for an improved user experience.

FIG. 1 is a functional block diagram illustrating an example of a feed service/system 100 in which an embodiment of the present invention may be implemented and deployed. The system 100 can be used to generate a content feed containing an ordering of content items such as user profiles, job postings, user posts, status updates, messages sponsored content, event descriptions, articles, images, audio, video, documents, and/or other types of content. For example, the system 100 may be used to customize the content feed to the attributes, behavior, and/or interests of members or related groups of members (e.g., connections, follows, schools, companies, group activity, member segments, etc.) in a connection network, social network and/or online professional network.

The system 100 can include data stores 102, which can be sharded by various keys. For example, the data stores 102 can store timeline records and various data indexed on different actors, such as users, companies, etc. who created content items. The candidate generation layer 104 can be comprised of first pass rankers (FPRs) including an articles ranker 112, a jobs ranker 114, followfeed 116, news 118 and activities from hashtags 119. FPRs create a preliminary candidate selection from their inventories based on predicted relevance to the feed viewer. Examples include updates from a user's network, job recommendations, and sponsored updates. A second pass ranker (SPR) then combines and scores the output from all FPRs. Although any FPRs of the candidate generation layer 104 can be used to implement portions of embodiments, hereinafter embodiments will be described with respect to the followfeed 116.

The followfeed 116 can query the data stores 102 for content items for inclusion in a content feed. The followfeed 116 may query the data stores 102 and rank the results using parameters related to the member's connections, groups, follows, companies, and/or schools in the connection network or social network, as well as other parameters. Based on the query of the data stores 102 and the ranking, the followfeed 116 can recommend a number of updates to serve feeds by, for example, providing updates to a feed service SPR 120. The feed service SPR 120 can then provide (e.g., "surface") content items to the connection network system 108 over link 110, where a user can view the content items or otherwise interact with the content items.

To address the aforementioned technical problems, embodiments of the present invention provide impression discounting at the candidate generation layer 104, and specifically in the followfeed 116. To address scalability, approximation is done in bulk for content a user has seen. Moving impression discounting to the candidate generation layer 104 also open up other possibilities of use cases in which the jobs FPR 114, articles FPR 112, news FPR 118, and activities from hashtags FPR 119 (or any other FPR not shown in FIG. 1) can provide rankings and indexings based on whether content has been viewed. Performing impression discounting at the followfeed 116 (or other FPR) can help to increase the depth and the number of candidates that sent from the FPRs to the SPR/s. Further, to ensure that the unseen updates are relevant to the user, embodiments of the present invention also provide an age-based exponential decay re-ranking, performed in some embodiments by the feed service SPR 120.

It can be difficult for FPRs to filter out seen updates due to the scale in which the FPRs operate. For example, FPRs can retrieve hundreds of thousands of documents in any given search of data stores 102. Accordingly, embodiments of the invention approximate the filtering by performing a first query to determine recently-impressed items (e.g., a number "N" most recent impressed items) viewed by a user of connection network.

The first query can be performed on an online feature store 122 by the feed service SPR 120. The online feature store 122 can be implemented using Pinot, which is an open source distributed relational online, analytical processing (OLAP) database management system written by LinkedIn. The first query and any other queries can be implemented in a query language, such as the Pinot Query Language ("PQL"), Structured Query Language ("SQL"), the MySQL query language, PostgreSQL query language, the PL/SQL query language, or any other database query language now known or later developed. Results can be packaged as a tensor feature/query dependent data (QDP) and sent to the followfeed 116. The tensor can be unpacked to a hashset and used in a filtering stage in a followfeed query when building the top K items obtained in a second query. Concurrently with the first query, the followfeed 116 can performing the second query of search nodes (e.g., data stores 102) to generate a set of K search node results, wherein K is the number of search node results retrieved from the data stores 102.

In some embodiments, the followfeed 116 can then filter the N recently-impressed items from the set of K search node results to generate a candidate set 124 that will be provided to, for example, the feed service SPR 120. As N>>K, the coverage is effective enough to reduce the feed service SPR 120 discounting rate significantly (e.g., from around 35% to around 20%) while not increasing the latency of the followfeed 116 or other FPRs 112, 114, 118, 119. In context of embodiments, "coverage" is defined as the proportion of documents from corpus that has nonzero member impression counts. Also, as N>>K, the discounting performed is not of the full K search node results, and accordingly is not a "full discounting."

In systems and algorithms according to embodiments, the followfeed 116 can be more effective by sending more unseen inventory (e.g., about 25% more, because of the impression discounting being done at the followfeed 116) to the feed service SPR 120, increasing recall of the system 100 and providing a fresher feed to the user.

In some embodiments, the online feature store 122 is not used to determine recently impressed items but instead if an activity is associated with members who have seen it, then impression discounting can be done in the shards of the data stores 102. In still other embodiments, the online feature store 122 is not used, and if a user-seen activity is added as a new timeline then not all viewer information will be available in a shard and the followfeed 116 will make two queries to the data stores 102, such that a first large set is returned by the first query, and the second is to determine user-seen updates. The results of the second query can then be subtracted from the results of the first query.

The above approximation strategy can be used by any candidate generation layers (e.g., the articles FPR 112, the jobs FPR 114, the news FPR 118 and/or the activities from hashtags 119). Furthermore, by executing the first query concurrently with execution of the second query (on data stores 102), computation time and latency can be significantly reduced.

Additionally, the first query can be sped up in example embodiments, because the first query can comprise a batch query, and a key for the first query can comprise simply a member identifier of the user of the connection network. In contrast, in available systems, queries of the viewer feature stores 122 would have used two keys, the second involving the document identifier for which impression data is desired. An example query pattern in some embodiments can include:

SELECT itemUrns FROM feedImpression Counting
WHERE daysSinceEpoch>=today-14
AND memberId=memberId
ORDER BY daysSinceEpoch DESC LIMIT 2000

In addition to the above impression discounting functions provided by the followfeed 116, the feed service SPR 120 can apply a freshness factor to the candidate set 124. Application of the freshness factor can help improve user-perceived freshness in some embodiments. For example, while providing impression discounting in the followfeed 116 can allow the followfeed 116 to send additional unexplored inventory to the feed service SPR 120, there can be an increase in some members viewing older content (e.g., 4-14-day-old content) in their feeds, which leads to a sub-optimal user experience.

To address these concerns, the feed service SPR 120 may apply a global freshness factor (Equation (1)) that decays updates based on age buckets corresponding to the UI age shown to users when viewing a feed. This factor will be coupled with the above-described functionality of the followfeed 116 in accordance with embodiments to enable tuning of the composition of feed updates by age and mitigate the presence of very old updates in the top slots of the feed.

The freshness factor can include an exponential decay factor and be applied by the feed service SPR 120 to an SPR ranking score (Equation (2)). The feed service SPR 120 can determine an age for each item of the candidate set 124 for calculating the freshness factor. For example, the freshness factor can be computed in a stepwise manner that aligns with the UI age shown to members. Equation (1) is one example computation of freshness factor:

$$freshnessFactor = 1.0 + N_0 * \exp(-rootAgeBucket * \log(2.0)/halfLife) \quad (1)$$

where $N_0$ (a boost factor) and halfLife are constants to be adjusted as described below. c is a constant, greater than or equal to 1.0, that, when multiplied with SPR score, ensures that the SPR score does not decrease based on freshCorrect, this is used to multiply with score as a boost factor. It needs to be at least 1.0 as the score shouldn't decrease due to freshnessFactor.

The feed service SPR 122 can place each item of the candidate set 124 in an age bucket (e.g., a rootAgeBucket) based on the UI age for a respective item, such that the age bucket is comprised of items of similar ages, where age is based on the inner-most activity related to a post. For example, a connection network feed (e.g., a social media feed although embodiments are not limited thereto) may be comprised of nested activities and the innermost item in that nest is the "root" item. By way of illustration, given a user reposting a contact's news item, the contact's original news item is the "root" item. The age bucket can correspond to an age displayed to the user upon visiting the connection network application (e.g., a UI age). For example, an item of the candidate set 124 that is between 0 and 23 hours old can be added to one of 24 hourly age buckets. Items of the candidate set 124 that are between 7 and 14 days old can be added to a same age bucket. However, embodiments are not limited to any particular method for placing the candidate set 124 into age buckets, or to any particular number of age buckets or age delineation of age buckets.

Systems and methods according to some embodiments can separate the candidate set 124 into age buckets based on an understanding of how users will perceive importance or timeliness of updates at various stages. For example, users may consider the difference between two and three hours of freshness to be more important than the difference between 7 and 8 days of freshness, and accordingly more granularity in freshness is provided by putting updates into hourly age buckets, and less granularity is provided by putting updates into daily, weekly, or monthly age buckets. The specific age bucket values can be tuned based on user reports or feedback, or experimental data.

The freshness factor can also take into consideration $N_0$ (a booster factor) and halfLife. The boost factor $N_0$ can boost items generated since a last visit time to the connection network application such that application of the freshness factor provides an indication of increased freshness for the boosted items. The value for halfLife can indicate a desired steepness of a curve representing freshness factor values for items of the candidate set 124. For example, a small value for halfLife can causes a sudden decay as can be appreciated by Equation (1) above. Accordingly, values for $N_0$ and halfLife can be adjusted in different ways to achieve different results. Values for $N_0$ and halfLife can also be adjusted through experiments using different values and measuring user experience, such as user perceptions of freshness.

To improve creator response, for example, the most recent updates can be heavily boosted. Example values for halfLife in at least these embodiments can be between 4-8 hours. In other embodiments, the rootAgeBucket partitioning can be set to improve viewer perceived freshness, to help prevent old updates from being highly ranked. In at least these embodiments, buckets will be set on daily or weekly boundaries, rather than hourly boundaries, and halfLife values will be on the order of 1-2 weeks.

An example computation of an SPR score taking into account freshness factor is shown below. At least two exponential decay rankers can be provided: one exponential decay ranker can be based on an hourly decay, and a second exponential decay ranker can be based on a daily decay. More than two exponential decay rankers can be included, depending on the lifetime of feed updates and what granularity we need to control freshness. Generally, an hourly and weekly decay will be provided, as items older than one or two months are generally no longer of interest. The example given in Equation (2) provides an expression for SPR score comprised of two portions. A first portion ($N_{01}e^{\lambda 1 t}$) includes an exponential decay function for improving creator response, and a second portion ($N_{02}e^{\lambda 2 t}$) includes a decay function for view-perceived freshness. While two portions are shown, embodiments are not limited thereto:

$$SPRScore' = Score(1 + N_{01}e^{\lambda 1 t})(N_{02}e^{\lambda 2 t}) \quad (2)$$

where:
$N_{01}$=2 For half life 8 hours:$\lambda 1$=ln 2/8 hours
$N_{02}$=1 For half life 1 week:$\lambda 2$=ln 2/1 week and giving:

$$SPRScore' = \\ Score\left(1 + N_{01}e^{-\frac{ln2}{8}*age\ in\ hours -\frac{ln2}{8}*age\ in\ hours}\right)\left(1 + N_{01}e^{-\frac{ln2}{8}*age\ in\ weeks}\right)$$

In another example, SPR score can be given by:

$$Score' = Score\left(1 + N_{01}e^{-\frac{ln2}{8}*age\ hours -\frac{ln2}{8}*age\ hours}\right)\left(1 + N_{01}e^{-\frac{ln2}{8}*age\ hours}\right) \quad (3)$$

The feed service SPR 122 can then provide updates to display to the user of the connection network based on the SPR score value (e.g., as calculated in one of Equation (2) or (3) or another example) such that updates with a higher SPR score are more likely to be provided to the user's feed. Equation (2) can result in SPR score continuing to diminish, while Equation (3) can result in scores only being boosted if content is fresh and cannot decrease more than the original SPR score. Equation (3) can therefore provide a more gradual smoothing, while Equation (2) can result in a step function change. Equations (2) and (3) are based on the definition of exponential decay (e.g., "half life"), where given the decaying quantity, N(t), as the number of discrete elements in a certain set, the average length of time that an element remains in the set is defined as the lifetime, the exponential time constant, $\tau$ relates to the decay rate, $\lambda$ according to $$\tau = \frac{1}{\lambda}, \text{ and } N(t) = N_o e^{\frac{-t}{\tau}}.$$

Half life $$t_{\frac{1}{2}} = \frac{\ln 2}{\lambda}.$$

Figure 2:
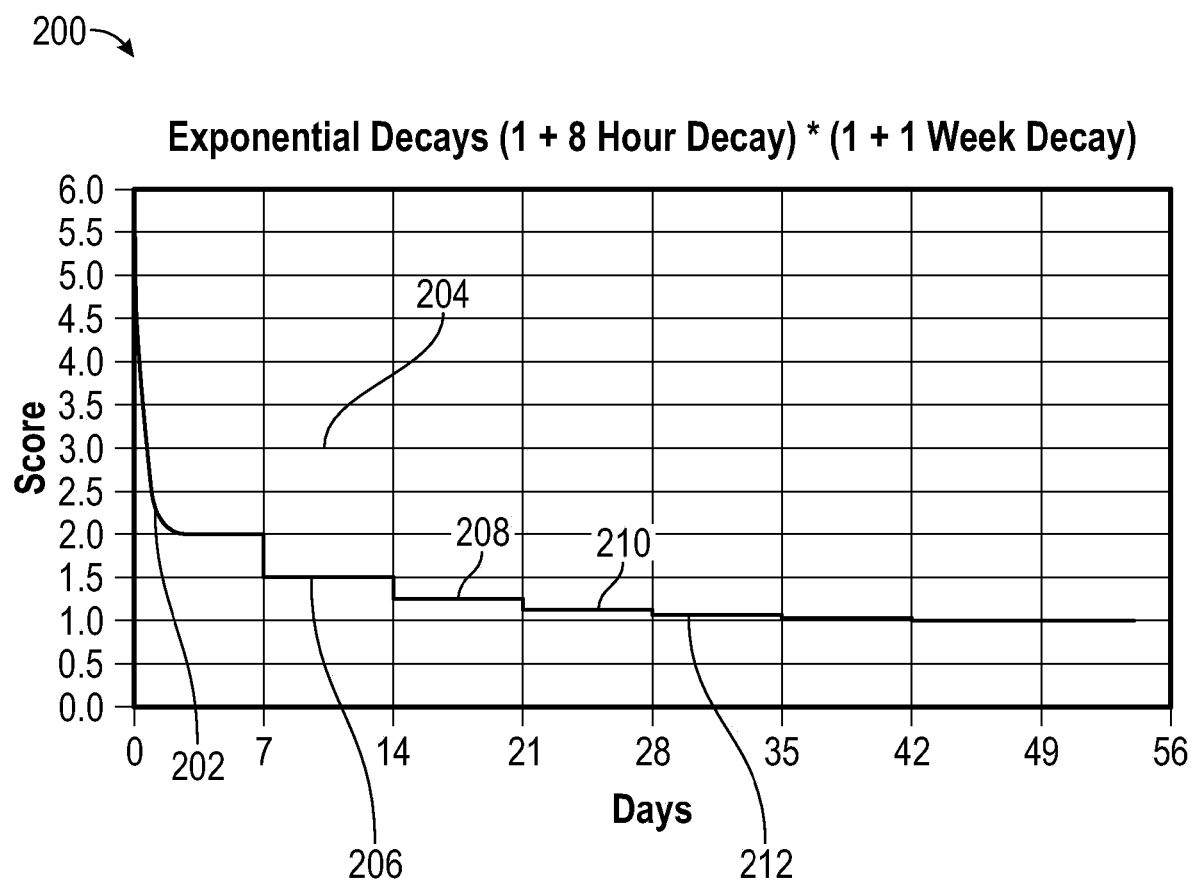
FIG. 2 illustrates decay factors associated with age buckets, consistent with an embodiment of the present invention.

This is seen graphically in FIG. 2, which illustrates SPR scores 200 associated with age buckets, consistent with an embodiment of the present invention. Portion 202 depicts a first decay function, which corresponds to data having a half life of 8 hours. Portion 204 depicts a second decay function, which corresponds to data having a half life of one week. Portions 206, 208, 210 and 212 depict that freshness can step down steeply at each of 7 days, 14 days, 21 days, and 28 days, but by a lesser amount with each passing 7-day interval.

Any of the coefficients or values used in Equations (1)-(3) (e.g., for $N_0$ and halfLife) can be passed into the system 100 using, for example, Venice storage. Venice storage is an asynchronous data serving platform using a distributed key-value storage system. Venice storage can allow systems in accordance with some embodiments to perform experiments using several variables to derive values for use in any of the embodiments described herein. Alternatively, values can be passed in using a lix and featureProxy to parse the lix values. However, embodiments are not limited to Venice storage or lix.

Figure 3:
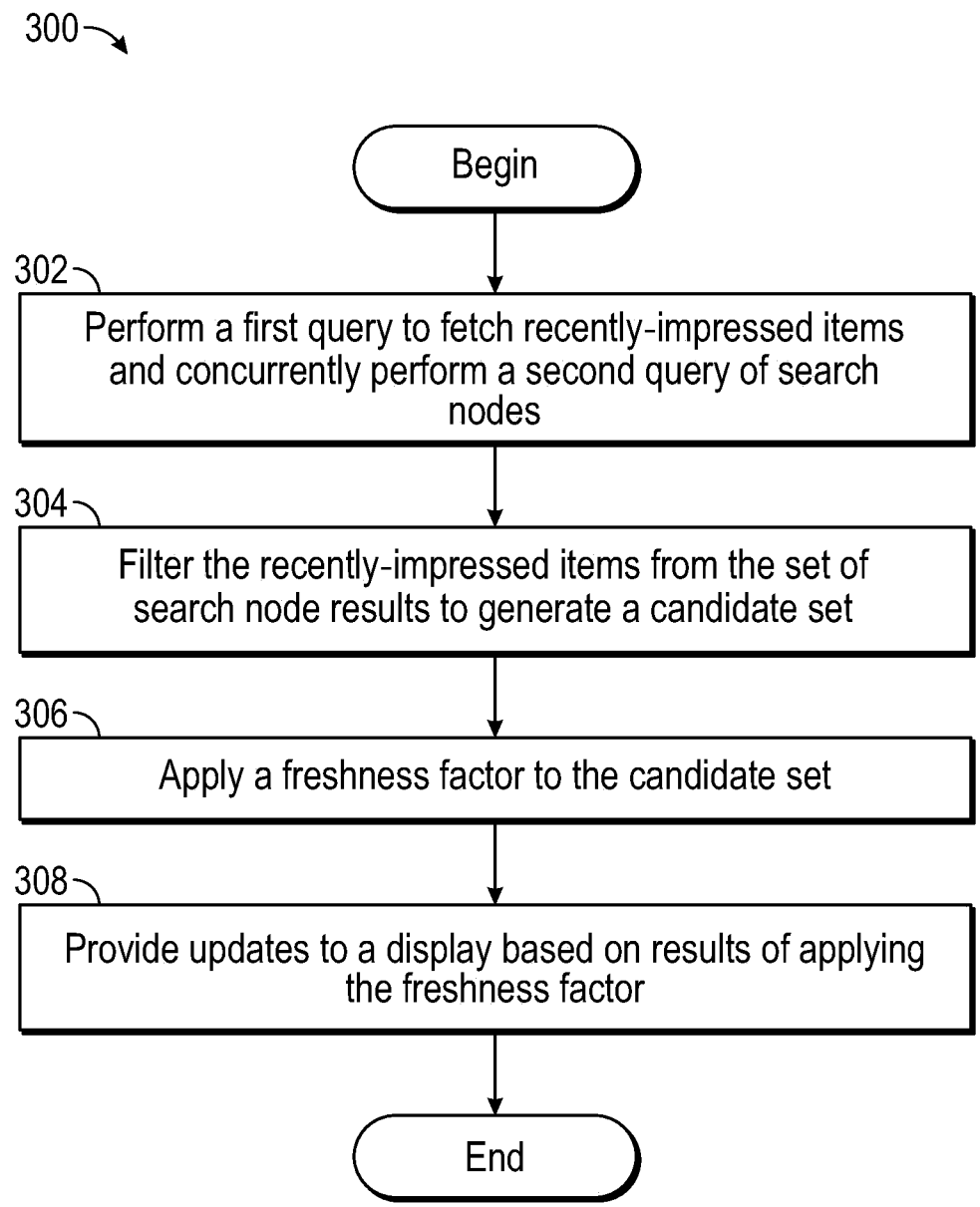
FIG. 3 is a flowchart diagram illustrating an example of the various operations of a method involved with some embodiments of the present invention.

FIG. 3 is a flowchart diagram illustrating an example of the various operations of a method 300 involved with some embodiments of the present invention. The method operations illustrated in FIG. 3 are those operations involved in providing impression discounting in a followfeed and adapting freshness algorithms in a feed service SPR.

As illustrated in FIG. 3, the method operations begin at method operation 302 when a software algorithm or routine processes perform a first query to fetch recently-impressed items viewed by a user of a connection network and, concurrently with the first query, performing a second query of search nodes to generate a set of search node results. As described above, the two queries can be run concurrently by the followfeed 116, with the first query being run against viewer feature stores 122 and the second query being run on data stores 102. In examples, the Next, at method operation 304, the followfeed 116 can filter the recently-impressed items from the set of search node results to generate a candidate set 124.

At method operation 306, an SPR (e.g., feed service 120) can apply a freshness factor to the candidate set. The freshness factor can be applied as described above with respect to Equations (1)-(3). For example, the freshness factor can be applied by determining an age for each item of the candidate set 124. Next, the feed service 120 can place each item of the candidate set in an age bucket based on the age for a respective item, the age bucket comprised of items of similar ages. The feed service 120 can then apply the freshness factor to an SPR ranking score for each item of the candidate set. In addition to the age bucket, the freshness factor can be based on a boost factor $N_0$ that boosts items generated since a last visit time to the connection network such that application of the freshness factor provides an indication of increased freshness for the respective items.

At method operation 308, an SPR (e.g., feed service 120) can provide updates to display to the user of the connection network based on results of applying the freshness factor.

Figure 4:
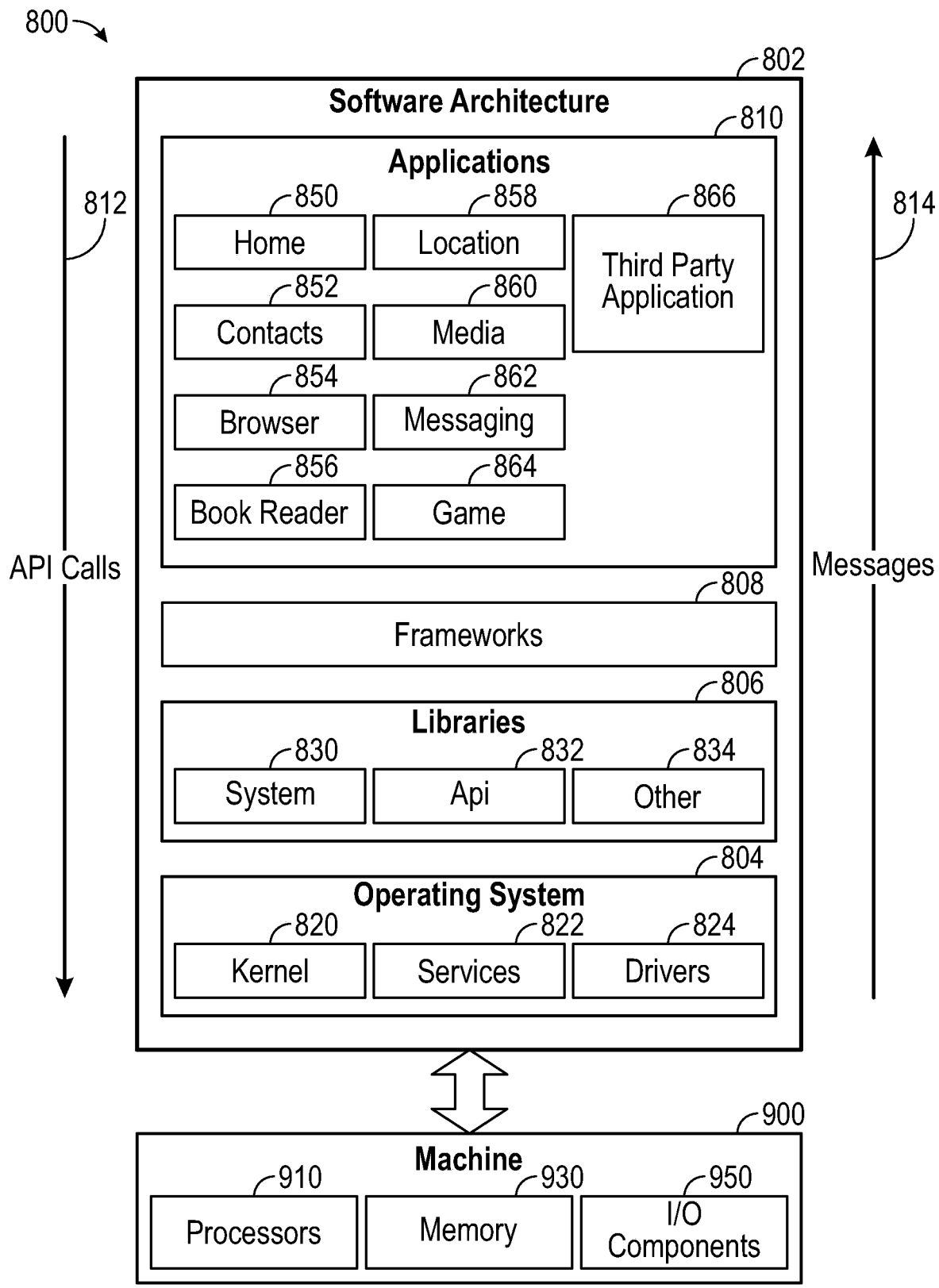
FIG. 4 is a block diagram illustrating a software architecture, which can be installed on any of a variety of computing devices to perform methods consistent with those described herein.

FIG. 4 is a block diagram 800 illustrating a software architecture 802, which can be installed on any of a variety of computing devices to perform methods consistent with those described herein. FIG. 4 is merely a non-limiting example of a software architecture, and it will be appreciated that many other architectures can be implemented to facilitate the functionality described herein. In various embodiments, the software architecture 802 is implemented by hardware such as a machine 900 of FIG. 5 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 5:
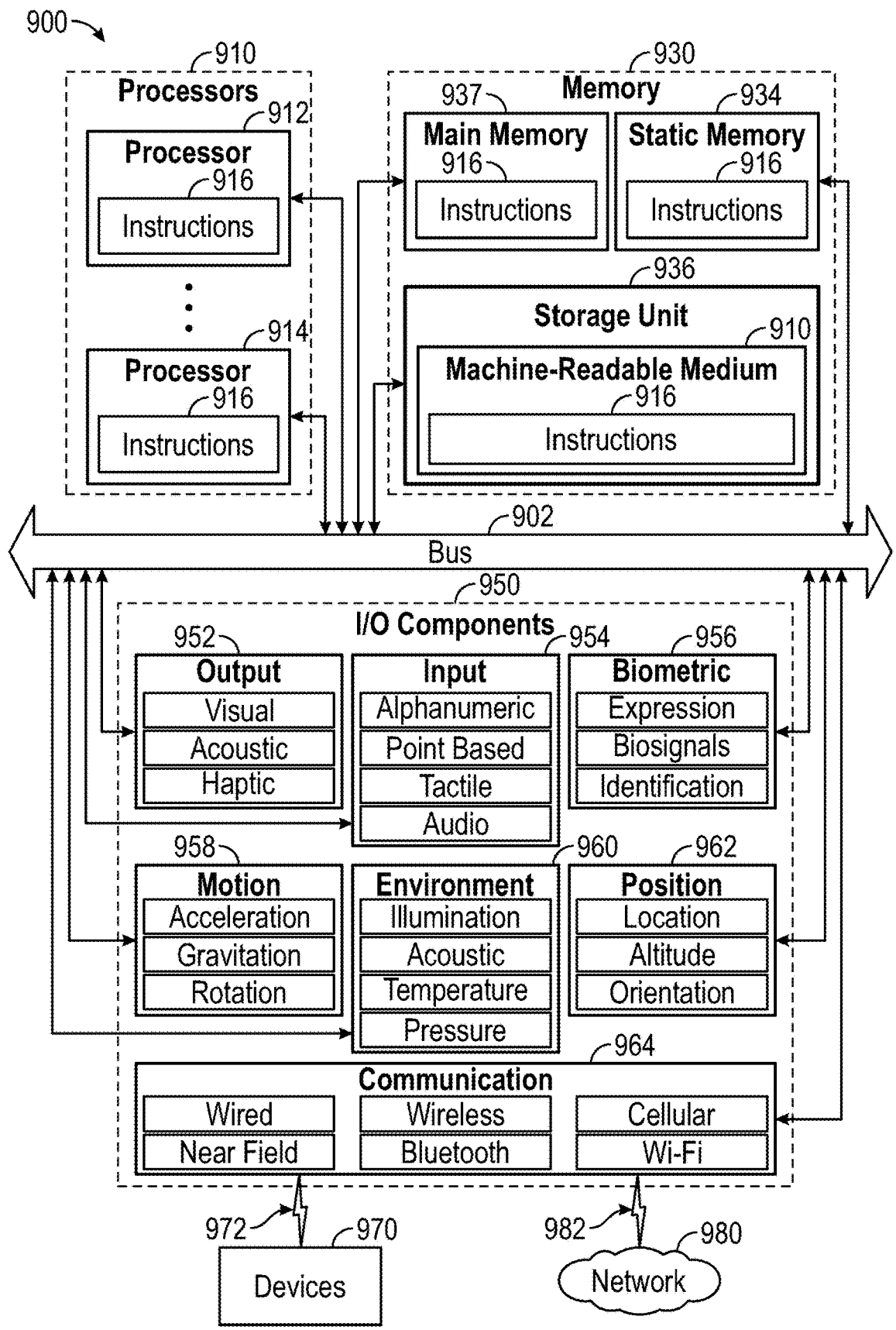
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 900 in the form of a computer system within which a set of instructions may be executed for causing the machine to perform any one or more of the methodologies discussed herein, according to an example embodiment. Specifically, FIG. 5 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithms described herein. Additionally, or alternatively, the instructions 916 may implement a system described in connection with FIG. 1, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 5 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 937, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 937, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 5. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 937, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a non-transitory computer-readable medium having instructions stored thereon, which, when executed by a processor, cause the system to:
perform, by a second pass ranker, a first query to fetch N most recent impressed items viewed by a user of a connection network application, wherein the first query comprises a batch query having only a single query key comprising a member identifier of the user;
concurrently with the first query, perform, by a first pass ranker, a second query to generate a set of top K search node results;
subsequent to the first query and the second query, filter, by the first pass ranker, the N most recent impressed items from the set of top K search node results to generate a candidate set that is provided to the second pass ranker;
apply, by the second pass ranker, a freshness factor to the candidate set; and
provide, by the second pass ranker, updates to display to the user of the connection network application based on results of applying the freshness factor.

2. The system of claim 1, wherein the computer-readable medium is storing additional instructions, which, when executed by the processor, cause the system to apply the freshness factor by:
determining an age for each item of the candidate set; and
placing each item of the candidate set in an age bucket based on the age for a respective item, the age bucket comprised of items of similar ages.

3. The system of claim 2, wherein the freshness factor is comprised of a boost factor that boosts items generated since a last visit time to the connection network application such that application of the freshness factor provides an indication of increased freshness for the boosted items.

4. The system of claim 3, wherein the freshness factor is further comprised of a half life component and wherein the freshness factor is based on the boost factor, the age bucket of the respective item, and a half life of the respective item.

5. The system of claim 2, wherein the age bucket corresponds to an age displayed to the user upon visiting the connection network application.

6. The system of claim 5, wherein an item of the candidate set that is between 0 and 23 hours old is added to one of 24 hourly age buckets.

7. The system of claim 5, wherein items of the candidate set that are between 7 and 14 days old are added to a same age bucket.

8. The system of claim 4, wherein the half life component comprises a first exponential decay ranker for hourly decay and a second exponential decay ranker for daily decay.

9. A method of providing updates to a user of a connection network application, the method comprising:
performing, by a second pass ranker, a first query to fetch N most recent impressed items viewed by a user of connection network application, wherein the first query comprises a batch query having only a single query key comprising a member identifier of the user;
concurrently with the first query, performing, by a first pass ranker, a second query to generate a set of top K search node results;
subsequent to the first query and the second query, filtering, by the first pass ranker, the N most recent impressed items from the set of K search node results to generate a candidate set that is provided to the second pass ranker;
applying, by the second pass ranker, a freshness factor to the candidate set; and
providing, by the second pass ranker, updates to display to the user of the connection network application based on results of applying the freshness factor.

10. The method of claim 9, wherein applying the freshness factor comprises:
determining an age for each item of the candidate set;
placing each item of the candidate set in an age bucket based on the age for a respective item, the age bucket comprised of items of similar ages; and
apply the freshness factor to an SPR ranking score for each item of the candidate set.

11. The method of claim 10, wherein the freshness factor is comprised of a boost factor that boosts items generated since a last visit time to the connection network application such that application of the freshness factor provides an indication of an increased freshness for the boosted items.

12. The method of claim 11, wherein the freshness factor is further comprised of a half life component and wherein the freshness factor is based on the boost factor, the age bucket of the respective item, and a half life.

13. The method of claim 11, wherein the age bucket corresponds to an age displayed to the user upon visiting the connection network application.

14. The method of claim 13, wherein an item of the candidate set that is between 0 and 23 hours old is added to one of 24 hourly age buckets.

15. The method of claim 13, wherein items of the candidate set that are between 7 and 14 days old are added to a same age bucket.

16. The method of claim 12, wherein the half life component comprises a first exponential decay ranker for hourly decay and a second exponential decay ranker for daily decay.

17. A system comprising:
   means for performing, by a second pass ranker, a first query to fetch N most recent impressed items viewed by a user of a connection network application, wherein the first query comprises a batch query having only a single query key comprising a member identifier of the user;
   means for performing, concurrently with the first query and by a first pass ranker, a second query to generate a set of top K search node results;
   means for filtering, subsequent to the first query and the second query, by the first pass ranker, the N most recent impressed items from the set of K search node results to generate a candidate set that is provided to the second pass ranker;
   means for applying, by the second pass ranker, a freshness factor to the candidate set; and
   means for providing, by the second pass ranker, updates to display to the user of the connection network application based on results of application of the freshness factor.

18. The system of claim 17, further comprising:
   means for determining an age for each item of the candidate set;
   means for placing each item of the candidate set in an age bucket based on the age for a respective item, the age bucket comprised of items of similar ages; and
   means for applying a freshness factor to an SPR ranking score for each item of the candidate set.

19. The system of claim 18, wherein the freshness factor is comprised of a boost factor that boosts items generated since a last visit time to the connection network application such that the freshness factor provides an indication of an increased freshness for the boosted items.

20. The system of claim 19, wherein the freshness factor is further comprised of a half life component and wherein the freshness factor is based on the boost factor, the age bucket of the respective item, and a half life indicating a desired steepness of a curve representing freshness factor values for items of the candidate set.

* * * * *